US012603469B2

(12) United States Patent　　　(10) Patent No.:　US 12,603,469 B2
Tanaka　　　　　　　　　　　　　(45) Date of Patent:　　Apr. 14, 2026

(54) OPTICAL RESONATOR, CONSTITUENT PART OF OPTICAL RESONATOR, AND LASER DEVICE

(71) Applicant: SONY GROUP CORPORATION, Tokyo (JP)

(72) Inventor: Kenji Tanaka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 741 days.

(21) Appl. No.: 17/904,324

(22) PCT Filed: Feb. 5, 2021

(86) PCT No.: PCT/JP2021/004227
§ 371 (c)(1),
(2) Date: Aug. 16, 2022

(87) PCT Pub. No.: WO2021/171957
PCT Pub. Date: Sep. 2, 2021

(65) Prior Publication Data
US 2023/0060536 A1　　Mar. 2, 2023

(30) Foreign Application Priority Data
Feb. 27, 2020　　(JP) ................................. 2020-031786

(51) Int. Cl.
*H01S 3/06*　　　　(2006.01)
*H01S 3/02*　　　　(2006.01)
*H01S 3/08*　　　　(2023.01)

(52) U.S. Cl.
CPC . *H01S 3/02* (2013.01); *H01S 3/08* (2013.01)

(58) Field of Classification Search
CPC .... H01S 3/1118; H01S 3/1115; H01S 3/1123; H01S 3/113; H01S 3/106–1062; H01S 3/08027; H01S 3/0627; H01S 3/08054
See application file for complete search history.

(56) References Cited

U.S. PATENT DOCUMENTS 5,237,577　A　*　8/1993　Keller .................... H01S 3/1118
372/18
5,394,413　A　*　2/1995　Zayhowski ........... H01S 3/0627
372/21
(Continued)

FOREIGN PATENT DOCUMENTS

CN　　　　101320880　A　　　12/2008
CN　　　　103972786　A　　　8/2014
(Continued)

OTHER PUBLICATIONS

International Search Report and Written Opinion of PCT Application No. PCT/JP2021/004227, issued on Apr. 20, 2021, 11 pages of ISRWO.

*Primary Examiner* — Xinning(Tom) Niu
*Assistant Examiner* — Delma R Forde
(74) *Attorney, Agent, or Firm* — CHIP LAW GROUP

(57)　　　　　　　　ABSTRACT

An optical resonator, a constituent part of the optical resonator, and a laser device that enable a reduction in size even if a wavelength band limiting element is disposed in the optical resonator, are provided.
An optical resonator including: a laser medium that is disposed between a pair of reflection members, and emits emitted light that has been excited by excitation light that has been predetermined; and a wavelength band limiting element that is disposed on a side of emission of the emitted light between the pair of reflection members, includes two reflection flat faces that are orthogonal to an optical axis of the laser medium, and limits a wavelength band of the emitted light, in which the wavelength band limiting element is disposed in a position that prevents a resonance component outside an intended wavelength range of the wavelength band limiting element from being generated between a reflection member on a laser beam emission side
(Continued)

from among the pair of reflection members and the wavelength band limiting element.

18 Claims, 10 Drawing Sheets

(56) References Cited

U.S. PATENT DOCUMENTS

| | | | |
|---|---|---|---|
| 6,826,205 B1 | 11/2004 | Myers | |
| 2003/0039274 A1 | 2/2003 | Neev | |
| 2007/0116068 A1 | 5/2007 | Mao | |
| 2008/0247425 A1* | 10/2008 | Welford | H01S 3/113 |
| | | | 372/10 |
| 2014/0086268 A1 | 3/2014 | Stultz | |
| 2015/0049775 A1 | 2/2015 | Jhon et al. | |
| 2020/0176946 A1* | 6/2020 | Kamata | A61F 9/008 |
| 2021/0167570 A1* | 6/2021 | Noach | H01S 3/08027 |

FOREIGN PATENT DOCUMENTS

| | | | | |
|---|---|---|---|---|
| JP | 06-067226 A | 3/1994 | | |
| JP | 2006-073962 A | 3/2006 | | |
| JP | 2008-537351 A | 9/2008 | | |
| JP | 2008-258627 A | 10/2008 | | |
| JP | 2010199288 A | 9/2010 | | |
| JP | 2014-135421 A | 7/2014 | | |
| JP | 2014135421 * | 7/2014 | H01S 3/08 | |
| JP | 2015-084390 A | 4/2015 | | |
| WO | 2018/221083 A1 | 12/2018 | | |

* cited by examiner

AVERAGE EXCITATION POWER (a.u.)

AVERAGE OUTPUT (a.u.)

AVERAGE EXCITATION POWER (a.u.)

AVERAGE OUTPUT (a.u.)

OPTICAL RESONATOR, CONSTITUENT PART OF OPTICAL RESONATOR, AND LASER DEVICE

CROSS REFERENCE TO RELATED APPLICATIONS

This application is a U.S. National Phase of International Patent Application No. PCT/JP2021/004227 filed on Feb. 5, 2021, which claims priority benefit of Japanese Patent Application No. JP 2020-031786 filed in the Japan Patent Office on Feb. 27, 2020. Each of the above-referenced applications is hereby incorporated herein by reference in its entirety.

TECHNICAL FIELD

The present disclosure relates to an optical resonator, a constituent part of the optical resonator, and a laser device.

BACKGROUND ART

In recent years, a variety of laser devices have been developed. For example, a passively Q-switched pulse laser device that changes a Q value by using a passive element has been enthusiastically developed. The size of such a laser device has been reduced.

Furthermore, as a wavelength band limiting element for narrowing a band of a laser beam, for example, an etalon element is used. However, the etalon element is disposed obliquely with respect to an optical axis, and therefore it becomes difficult to reduce the size of an optical resonator itself or a laser device.

CITATION LIST

Patent Document

Patent Document 1: Japanese Patent Application Laid-Open No. 2015-84390

SUMMARY OF THE INVENTION

Problems to be Solved by the Invention

An aspect of the present disclosure provides an optical resonator, a constituent part of the optical resonator, and a laser device that enable a reduction in size even if a wavelength band limiting element is disposed in the optical resonator.

Solutions to Problems

In order to solve the problems described above, in the present disclosure, a laser medium that is disposed between a pair of reflection members, and emits emitted light that has been excited by excitation light that has been predetermined; and a wavelength band limiting element that is disposed on a side of emission of the emitted light between the pair of reflection members, includes two reflection flat faces that are orthogonal to an optical axis of the laser medium, and limits a wavelength band of the emitted light are included, and the wavelength band limiting element is disposed in a position that prevents a resonance component outside an intended wavelength range of the wavelength band limiting element from being generated between a reflection member on a laser beam emission side from among the pair of reflection members and the wavelength band limiting element.

The wavelength band limiting element and the reflection member on the laser beam emission side may be adjacent to each other.

A distance between the wavelength band limiting element and the reflection member on the laser beam emission side may be within 50 microns.

A saturable absorber may be further included that is disposed between the laser medium and the wavelength band limiting element, a transmittance of the saturable absorber increasing according to absorption of the emitted light that has been emitted from the laser medium.

A saturable absorber may be located in the two reflection flat faces, a transmittance of the saturable absorber increasing according to absorption of the emitted light that has been emitted from the laser medium.

A space layer may be provided between the laser medium and the wavelength band limiting element.

A space layer may be provided between the saturable absorber and the wavelength band limiting element.

The saturable absorber may include a crystal body including first to third crystal axes that are orthogonal to each other, and may be disposed in the optical resonator to have respective different transmittances with respect to rays of the emitted light in two polarization directions that are orthogonal to each other, the rays of the emitted light having been emitted from the laser medium.

A saturable absorber may be located in the two reflection flat faces, a transmittance of the saturable absorber increasing according to absorption of the emitted light that has been emitted from the laser medium, and the saturable absorber may include a crystal body including first to third crystal axes that are orthogonal to each other, and may be disposed in the optical resonator to have respective different transmittances with respect to rays of the emitted light in two polarization directions that are orthogonal to each other, the rays of the emitted light having been emitted from the laser medium.

A saturable absorber may be located in the two reflection flat faces, a transmittance of the saturable absorber increasing according to absorption of the emitted light that has been emitted from the laser medium, the saturable absorber may include a crystal body including first to third crystal axes that are orthogonal to each other, and may be disposed in the optical resonator to have respective different transmittances with respect to rays of the emitted light in two polarization directions that are orthogonal to each other, the rays of the emitted light having been emitted from the laser medium, and a space layer may be provided between the laser medium and the wavelength band limiting element.

At least one of the pair of reflection members may include a polarization element, and the polarization element may have respective different reflectances with respect to rays of the emitted light in polarization directions that are orthogonal to each other.

A flat face on the laser beam emission side of the two reflection flat faces that are orthogonal to the optical axis may configure a reflection member on the laser beam emission side of the pair of reflection members.

A heat exhausting substrate may be further included that is disposed on a side that is opposite to the laser beam emission side of the laser medium.

The polarization element may include a photonic crystal having a periodical structure of an inorganic material.

The optical resonator described above; and an excitation light source unit that causes the excitation light to exit to the laser medium may be included.

In order to solve the problems described above, in the present disclosure, a constituent part of an optical resonator is provided, the constituent part including:

a saturable absorber that has a transmittance that increases according to absorption of emitted light that has been emitted from a laser medium; and two reflection flat face portions that are parallel to each other, and are included on both side faces of the saturable absorber.

In order to solve the problems described above, in the present disclosure, a constituent part of an optical resonator is provided, the constituent part including:

a pair of reflection members that configure the optical resonator; and a wavelength band limiting element that is disposed on a side of emission of the emitted light between the pair of reflection members, includes two reflection flat faces that are orthogonal to an optical axis of the optical resonator, and limits a wavelength band of the emitted light, in which a flat face on the side of emission of the emitted light from among the two reflection flat faces that are orthogonal to the optical axis configures a reflection member on the side of emission of the emitted light from among the pair of reflection members.

MODES FOR CARRYING OUT THE INVENTION

Embodiments of an optical resonator, a constituent part of the optical resonator, and a laser device are described below with reference to the drawings. The description below is provided while focusing on a principal constituent part portion of the optical resonator, the constituent part of the optical resonator, and the laser device, but the optical resonator, the constituent part of the optical resonator, and the laser device can include a constituent part portion or functions that are not illustrated or described. The description below is not to exclude the constituent part portion or functions that are not illustrated or described.

First Embodiment

Figure 1:
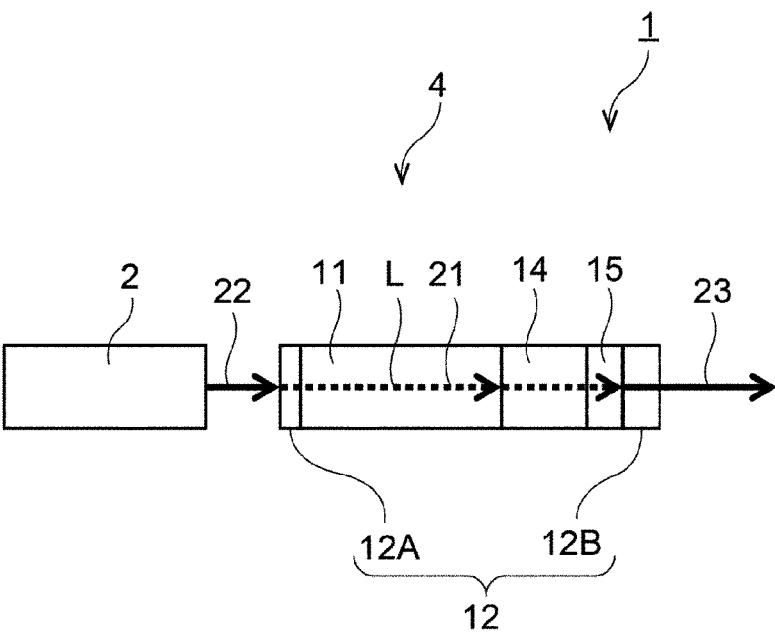
FIG. 1 is a diagram illustrating an example of a configuration of a laser device according to the present embodiment.

A configuration of a laser device according to the present embodiment is described with reference to FIG. 1. FIG. 1 is a diagram illustrating an example of the configuration of the laser device according to the present embodiment. A laser device 1 is, for example, a passively Q-switched pulse laser device, and includes an excitation light source unit 2 and an optical resonator 4.

The excitation light source unit 2 emits excitation light 22 that excites a laser medium in the optical resonator 4. More specifically, the excitation light source unit 2 emits excitation light 22 having a wavelength near 808 [nm] that excites, for example, Nd: YAG crystals, which is a laser medium. Furthermore, the excitation light source unit 2 does not need to include an optical system such as a lens, if the excitation light source unit 2 can make the excitation light 22 incident on the laser medium in the optical resonator 4.

The optical resonator 4 emits a laser beam that has been excited by the excitation light 22 emitted by the excitation light source unit 2. This optical resonator 4 includes a laser medium 11, a pair of reflection members 12, a saturable absorber 14, and a wavelength band limiting element 15. Note that in the present embodiment, it is assumed that an excitation light input side is an "upstream side", and an oscillating laser output side is a "downstream side".

The laser medium 11 is, for example, Nd: YAG crystals, is disposed between the pair of reflection members 12 that configure the optical resonator 4, and is emits emitted light that has been excited by predetermined excitation light. More specifically, the laser medium 11 is excited by excitation light 22 having a wavelength near 808 [nm]. Then, the laser medium 11 emits light having a wavelength of about 1064 [nm] in transition from an upper level of excitation to a lower level. Note that in the description below, light emitted by the laser medium 11 is referred to as emitted light 21.

A mirror 12A and an output mirror 12B configure the pair of reflection members 12. The mirror 12A is, for example, a mirror that transmits excitation light 22 that has been emitted from the excitation light source unit 2 and has a wavelength of about 808 [nm], and reflects, at a predetermined reflectance, emitted light 21 of about 1064 [nm] that has been emitted from the laser medium 11. The use of a mirror as the mirror 12A is merely an example, and can be appropriately changed. For example, an element including a dielectric multilayer may be used as the mirror 12A. Note that the above is illustrative, and examples are not limited to this.

The mirror 12B transmits part of light having a wavelength of about 1064 nm, and reflects the remainder. Note that the mirror 12A may be a dielectric multilayer formed on an end face of the Nd: YAG crystals 11.

The transmittance of the saturable absorber 14 increases according to absorption of emitted light that has been emitted from a laser medium. The saturable absorber 14 is a member that includes, for example, $Cr^{4+}$: YAG crystals and has a property in which light absorptivity decreases due to saturation of light absorption, and functions as a passive Q-switch in a case where a passively Q-switched pulse laser device is configured. In other words, if the emitted light 21 from the laser medium 11 has entered, the saturable absorber 14 absorbs the emitted light 21, and the transmittance of the saturable absorber 14 increases according to absorption. Then, in a case where an electron density of an excitation level increases, and the excitation level is satisfied, the saturable absorber 14 is made transparent, and therefore a Q value of the optical resonator increases, and laser oscillation occurs.

The wavelength band limiting element 15 is, for example, an etalon element, is disposed on a downstream side of the saturable absorber 14, and limits a wavelength band of the emitted light 21. The wavelength band limiting element 15 includes two reflection flat faces that are orthogonal to an optical axis L of the optical resonator, that is, an optical axis L of the laser medium 11, and limits the wavelength band of the emitted light 21. For example, emitted light 21 having a wavelength of about 1064 [nm] is transmitted. Note that the etalon element may be uncoated. Alternatively, the etalon element may be partially coated with a reflection film. Furthermore, the respective elements 11, 12, 14, and 15 that are included in the optical resonator 4 may be joined.

Next, an operation of this laser device 1 is described. As illustrated in FIG. 1, if excitation light 22 having a wavelength of about 808 nm has been output from the excitation light source unit 2, the excitation light 22 passes through the mirror 12A, enters the laser medium 11, excites the laser medium 11, and causes population inversion to occur. Next, if emitted light 21 having a wavelength near 1064 nm has been emitted due to transition from an upper level to a lower level in the excited laser medium 11, the emitted light 21 enters the saturable absorber 14, and is absorbed. If an electron density of an excitation level of the saturable absorber 14 has increased according to this absorption, and has been saturated, the saturable absorber 14 is made transparent. As a result, a Q value of the optical resonator 4 increases, and laser oscillation occurs. Then, the wavelength band limiting element 15 limits a band of a laser beam to a wavelength of about 1064 nm, and laser 23 is output from the mirror 12B.

Here, resonance in the resonator 4 of the wavelength band limiting element 15 is described with reference to FIGS. 2A, 2B, 20, 2D, 3A, 3B, 4A, and 4B. FIGS. 2A, 2B, 20, and 2D are diagrams schematically illustrating resonance in the resonator 4 of the wavelength band limiting element 15. As described later, the saturable absorber 14 is configured as the wavelength band limiting element 15 in some cases. In these cases, an element on an upstream side of the wavelength band limiting element 15 is the laser medium 11. Therefore, in FIGS. 2A, 2B, 20, and 2D, the element on the upstream side of the wavelength band limiting element 15 is illustrated as the laser medium 11 or the saturable absorber 14.

Figure 2B:
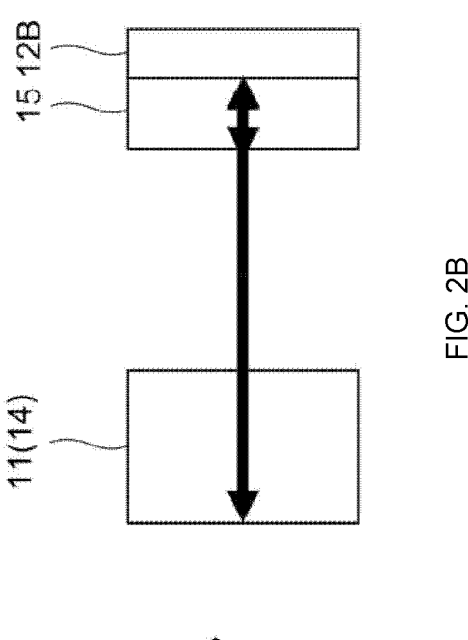
FIGS. 2A, 2B, 2C, and 2D are diagrams schematically illustrating resonance in a resonator of a wavelength band limiting element.
Figure 2D:
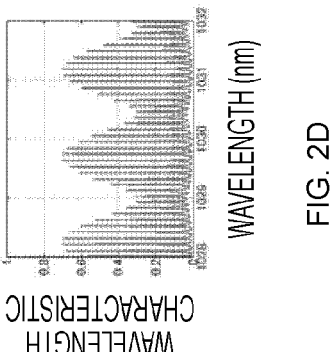
Figure 2A:
Figure 2A:
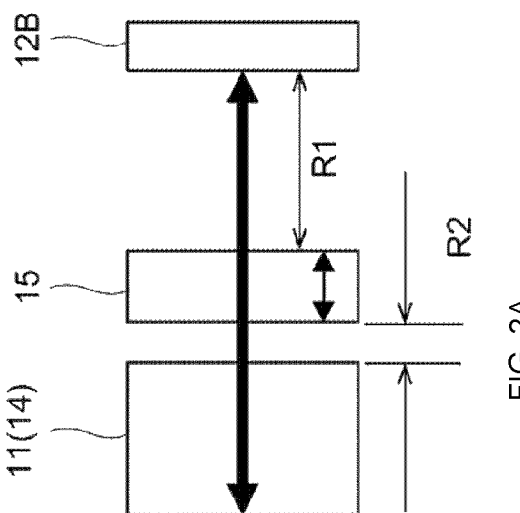

FIG. 2A is a diagram illustrating a relationship between a first distance R1 between the wavelength band limiting element 15 and the mirror 12B of the pair of reflection members 12 and a second distance R2 between an output side of the laser medium 11 and the wavelength band limiting element 15. FIG. 2B is a diagram illustrating an example where the wavelength band limiting element 15 is adjacent to the mirror 12B. Here, being adjacent means, for example, a case where the first distance R1 is within 50 microns. In other words, being adjacent means that the wavelength band limiting element 15 and the mirror 12B may or may not be in contact with each other.

Figure 2C:
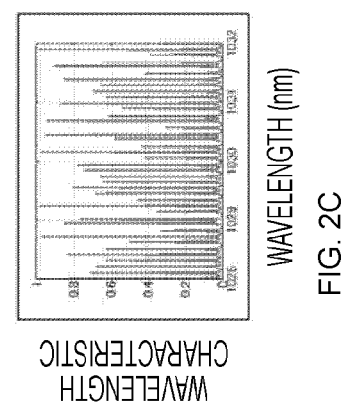

FIGS. 2C and 2D illustrate a wavelength of the laser 23 that has been output from the mirror 12B. A horizontal axis indicates a wavelength, and a vertical axis indicates intensity.

As illustrated in FIG. 2C, resonance occurs between the wavelength band limiting element 15 and the mirror 12B, and transmitted light having an intensity of 0.8 or more occurs at random. In order to prevent such resonance, in a conventional general method, oblique disposition with respect to the optical axis L is employed in such a way that other resonance with another mirror in the resonator 4 is not generated. Thus, for oblique disposition with respect to the optical axis L, a structure becomes complicated, and a larger space is required. Therefore, use in a state of being joined to another element is difficult, and this has a harmful effect on a reduction in size of the resonator 4.

In view of this, in the present embodiment, the wavelength band limiting element 15 and the mirror 12B are disposed to be adjacent to each other, as illustrated in FIG. 2B. In this case, resonance between the wavelength band limiting element 15 and the mirror 12B is further prevented, as illustrated in FIG. 2D, and therefore laser 23 that has a band limited by the wavelength band limiting element 15 and has an intended wavelength is output. As described above, resonance between the wavelength band limiting element 15 and the mirror 12B is prevented according to a reduction in the distance R1. In particular, in a case where the wavelength band limiting element 15 and the mirror 12B are disposed to be adjacent to each other, resonance between the wavelength band limiting element 15 and the mirror 12B are further prevented.

Figures 3A, 3B:
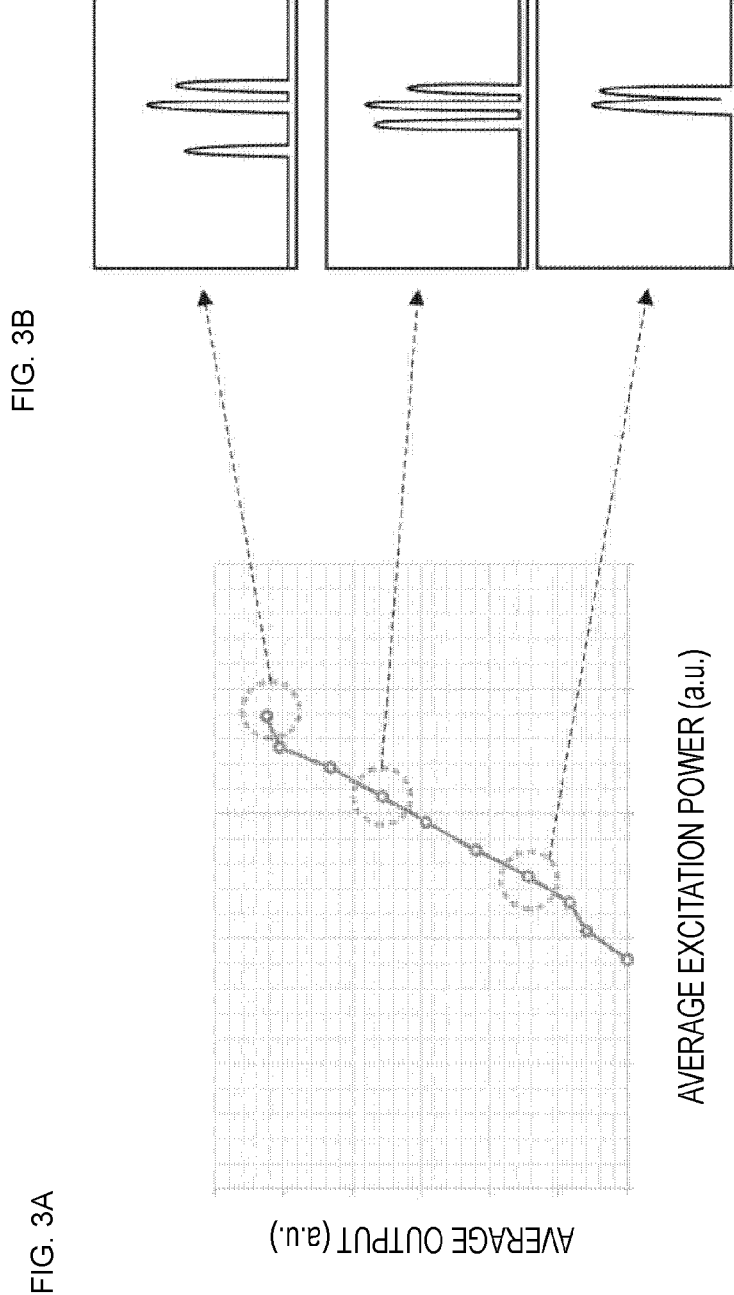
FIGS. 3A and 3B are diagrams in which a spectrum of laser has been measured in the disposition of FIG. 2A.

FIGS. 3A and 3B are diagrams in which a spectrum of the laser 23 has been measured in the disposition of FIG. 2A. FIG. 3A is a diagram in which a horizontal axis indicates average excitation power and a vertical axis indicates an average output. FIG. 3B is a diagram illustrating spectra of the laser 23 at the points illustrated as three circles in FIG. 3A. In the drawing, a horizontal axis indicates a wavelength, and a vertical axis indicates power. As illustrated in FIGS. 3A and 3B, the spectra have a multimode.

Figures 4A, 4B:
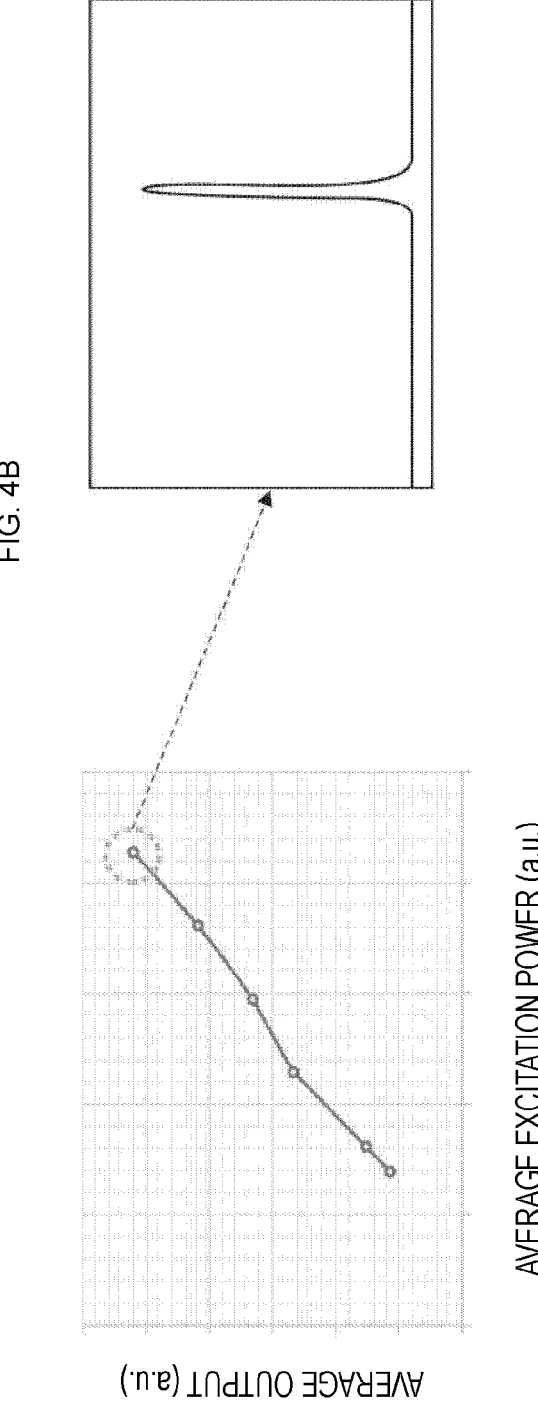
FIGS. 4A and 4B are diagrams in which a spectrum of laser has been measured in the disposition of FIG. 2B.

In contrast, FIGS. 4A and 4B are diagrams in which a spectrum of the laser 23 has been measured in the disposition of FIG. 2B. FIG. 4A is a diagram in which a horizontal axis indicates average excitation power and a vertical axis indicates an average output. FIG. 4B is a diagram illustrating a spectrum of the laser 23 at the point illustrated as a circle in FIG. 4A. In the drawing, a horizontal axis indicates a wavelength, and a vertical axis indicates power. As illustrated in FIGS. 4A and 4B, the prevention of resonance enables a spectrum to have a single mode.

As described above, the wavelength band limiting element 15 is disposed in a position where resonance with the mirror 12B of the reflection member 12 is prevented from occurring in a state where a relationship of two reflection flat faces being orthogonal to the optical axis L is maintained. By doing this, resonance is prevented from occurring, and laser 23 having an intended wavelength band can be output from the mirror 12B. In particular, by disposing the wavelength band limiting element 15 to be adjacent to the mirror 12B, resonance is further prevented from occurring. Furthermore, by disposing the wavelength band limiting element 15 in a state where a relationship of the two refection flat faces being orthogonal to the optical axis L is maintained, the wavelength band limiting element 15 can be adjacent or joined to the mirror 12B and the saturable absorber 14, and the size of the optical resonator 4 can be further reduced.

Variation of First Embodiment

In the first embodiment, a case where Nd: YAG crystals are used as the laser medium 11, and $Cr^{4+}$: YAG crystals are used as the saturable absorber 14 has been described. However, this is merely an example, and a combination of the laser medium 11 and the saturable absorber 14 can be appropriately changed.

Accordingly, in a variation of the first embodiment, as the laser medium 11, for example, $Nd^{3+}$: YAG ceramics (emitted light 21 having a wavelength near 1064 [nm] is emitted), Nd: $YVO_4$ (emitted light 21 having a wavelength near 1064 [nm] is emitted), or Yb: YAG (emitted light 21 having a wavelength near 1030 [nm] or 1050 [nm] is emitted), rather than Nd: YAG crystals, may be used. Furthermore, in a case where a different laser medium is used, excitation light having a wavelength optimal for excitation is appropriately selected.

Note that in a case where Nd: YAG, Nd: $YVO_4$, or Yb: YAG is used as the laser medium 11, Cr: YAG, a semiconductor saturable absorber mirror (SESAM), or the like is used as the saturable absorber 14.

Furthermore, as the laser medium 11, Er glass (emitted light 21 having a wavelength near 1540 [nm] is emitted) may be used. Note that in a case where Er glass is used as the laser medium 11, $Co^{2+}$: MALO, $Co^{2+}$: LaMgAl, $U^{2+}$: $CaF_2$, $Er^{3+}$: $CaF_2$, or the like is used as the saturable absorber 14.

Second Embodiment

A laser light source 1 according to a second embodiment is different from the laser light source 1 according to the first embodiment in that at least one of the mirror 12A or 12B has a polarization function. A difference with the laser light source 1 according to the first embodiment is described below.

Figure 5:
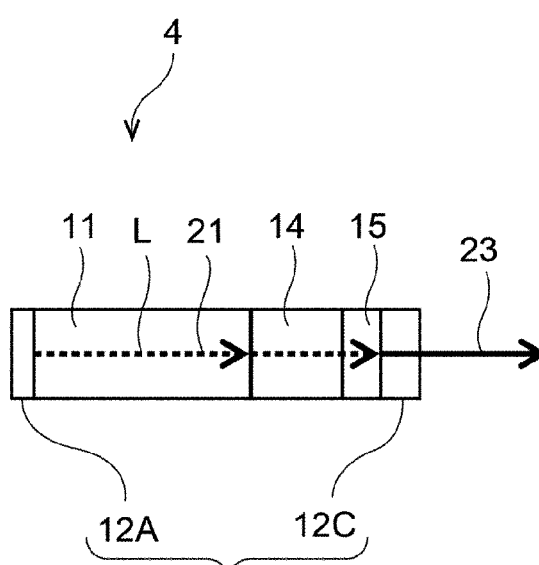
FIG. 5 is a diagram illustrating a configuration of an optical resonator according to a second embodiment.

FIG. 5 is a diagram illustrating a configuration of an optical resonator 4 according to the second embodiment. As illustrated in FIG. 5, a mirror 12C has a polarization function. The mirror 12A may be a polarization element, or the mirror 12A and the mirror 12C may be polarization elements. A case where in the optical resonator 4 according to the present embodiment, the mirror 12C is a polarization element is described as an example.

More specifically, the mirror 12C includes a polarization element having a polarization selection function. The polarization element is an element having different reflectance with respect to emitted light 21 according to a polarization direction. Reflectance changes with respect to emitted light in each orthogonal polarization direction, and therefore laser oscillation occurs in response to emitted light in a polarization direction that causes a higher reflectance. In other words, a polarization direction of emitted light is controlled by the polarization element, and as a result, a laser beam in a stable polarization direction is generated.

A member to be used as the polarization element is not particularly limited. For example, as the polarization element according to the present embodiment, a photonic crystal polarization element using photonic crystals, a wire grid polarization element using a wire grid, or a polarization element utilizing orientation of a resin material may be used.

In a case where an output of a laser beam ejected by the laser device 1 is high, an electric field amplitude in the optical resonator 4 increases. In other words, a load imposed on the polarization element increases, and therefore it is more preferable that a polarization element that can withstand a requested output be used. In this point, photonic crystals can exhibit higher resistance to a load imposed due to laser oscillation, depending on material, a structure, or the like. Furthermore, a wire grid has a characteristic of absorbing emitted light 21, but photonic crystals do not have such a characteristic, and therefore it is likely that the photonic crystal polarization element achieves the efficiency of oscillation that is higher than the efficiency of oscillation of the wire grid polarization element. In view of the above, a case where the photonic crystal polarization element using photonic crystals is used as the polarization element according to the present embodiment is described as an example. Note that in order to cause laser to more efficiently oscillate in response to emitted light 21 in a desired polarization direction, it is preferable that a difference in reflectance of the photonic crystal polarization element with respect to rays of emitted light 21 in polarization directions orthogonal to each other be 1 [%] or more. However, this is not restrictive, and a difference in reflectance of the photonic crystal polarization element with respect to rays of emitted light 21 in polarization directions orthogonal to each other may be appropriately changed.

Furthermore, in order to cause laser to oscillate more efficiently and improve resistance, it is preferable that a thickness per layer of photonic crystals included in the photonic crystal polarization element be roughly the same as a wavelength of emitted light 21. However, this is not restrictive, and a thickness per layer of photonic crystals may be appropriately changed. For example, a thickness per layer of the photonic crystals may be smaller (or greater) than the wavelength of emitted light 21 by a predetermined value. Furthermore, as a material of photonic crystals, for example, $SiO_2$, SiN, $Ta_2O_5$, or the like can be used. However, this is not restrictive, and the material of photonic crystals may be appropriately changed.

As described above, in the laser device 1 according to the present embodiment, one of the pair of reflection members 12 is a polarization element. By doing this, the length of an optical resonator decreases in comparison with a case where the polarization element is inserted between the pair of reflection members 12. Therefore, the laser device 1 according to the present embodiment cannot only generate pulse laser in a stable polarization direction, but can also prevent an increase in a pulse width and a decrease in peak intensity due to an increase in length of the optical resonator, and the sizes of the optical resonator 4 and the laser device 1 can be reduced.

Variation of Second Embodiment

Figure 6:
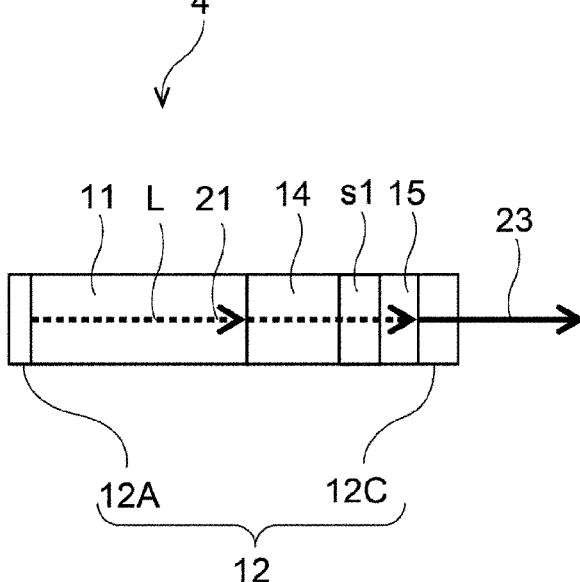
FIG. 6 is a diagram illustrating an example of a configuration of an optical resonator in a variation of the second embodiment.

FIG. 6 is a diagram illustrating an example of a configuration of an optical resonator 4 in a variation of the second embodiment. As illustrated in FIG. 6, a spacer layer s1 may be included in the optical resonator 4. For example, the spacer layer s1 includes an air layer or a dielectric layer. The spacer layer s1 can be used, for example, to adjust a pulse width and a peak intensity of a laser beam 23. Furthermore, the spacer layer s1 may be included between the laser medium 11 and the saturable absorber 14.

Third Embodiment

A laser light source 1 according to a second embodiment is different from the laser light source 1 according to the second embodiment in that a saturable absorber is included in two reflection flat faces in a wavelength band limiting element. A difference with the laser light source 1 according to the second embodiment is described below.

Figure 7:
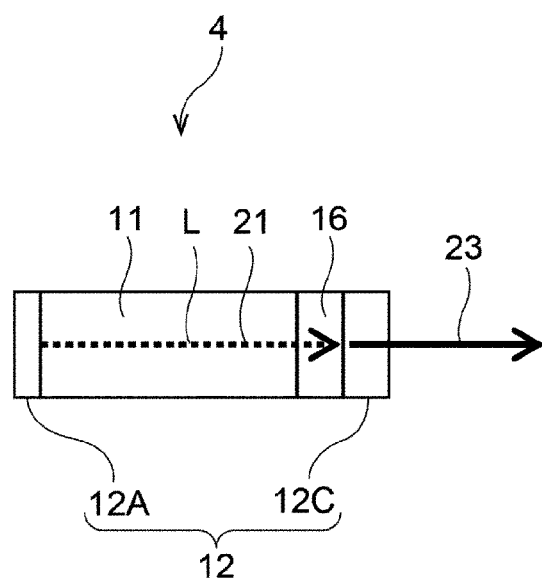
FIG. 7 is a diagram illustrating a configuration of an optical resonator according to a third embodiment.

FIG. 7 is a diagram illustrating a configuration of an optical resonator 4 according to the third embodiment. As illustrated in FIG. 7, a wavelength band limiting element 16 includes a saturable absorber in two reflection flat faces in the wavelength band limiting element. More specifically, the wavelength band limiting element 16 includes a saturable absorber in which transmittance increases according to absorption of emitted light that has been emitted from a laser medium, and two reflection flat face portions that are parallel to each other and are included in both side faces of the saturable absorber.

As described above, in the laser device 1 according to the present embodiment, a saturable absorber is included in two reflection flat faces in the wavelength band limiting element 16. By doing this, the length of an optical resonator can be further reduced in comparison with a case where the saturable absorber 14 and the wavelength band limiting element 15 are separately included. Therefore, the laser device 1 according to the present embodiment can further prevent an increase in a pulse width and a decrease in peak intensity due to an increase in length of the optical resonator, and the sizes of the optical resonator 4 and the laser device 1 can be further reduced.

First Variation of Third Embodiment

Figure 8:
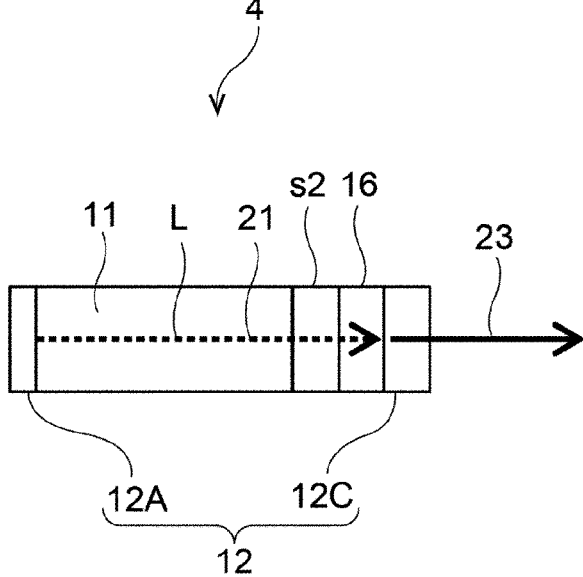
FIG. 8 is a diagram illustrating an example of a configuration of an optical resonator in a first variation of the third embodiment.

FIG. 8 is a diagram illustrating an example of a configuration of an optical resonator 4 in a first variation of the third embodiment. As illustrated in FIG. 8, a spacer layer s2 may be included in the optical resonator 4. For example, the spacer layer s2 includes an air layer or a dielectric layer. The spacer layer s2 can be used, for example, to adjust a pulse width and a peak intensity of the laser beam 23.

Second Variation of Third Embodiment

Figure 9:
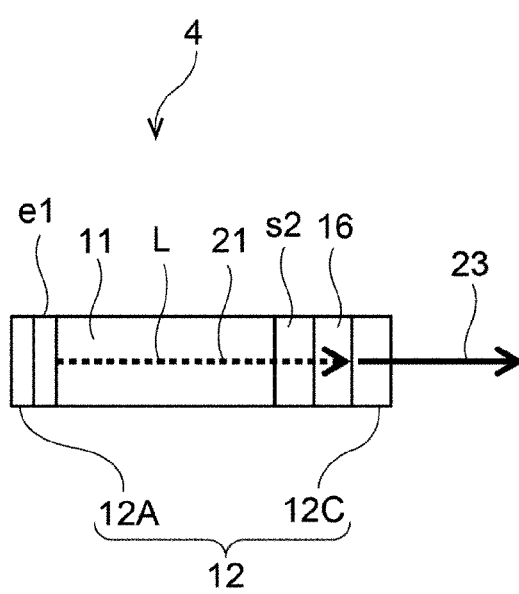
FIG. 9 is a diagram illustrating an example where a heat exhausting substrate is included in an optical resonator in a second variation of the third embodiment.

FIG. 9 is a diagram illustrating an example where a heat exhausting substrate e1 is included in an optical resonator 4 in a second variation of the third embodiment. As illustrated in FIG. 9, the heat exhausting substrate e1 may be further included in the optical resonator 4. For example, the heat exhausting substrate e1 includes sapphire. The heat exhausting substrate can prevent an increase in temperature in the optical resonator 4. Furthermore, the heat exhausting substrate e1 is included in the optical resonator 4 according to the third embodiment, but this is not restrictive. For example, the heat exhausting substrate e1 may be included in all of the optical resonators 4 disclosed in the present embodiments (for example, the optical resonators 4 illustrated in FIGS. 1, 5, 6, 7, 8, and the like that have been described above, and the optical resonators 4 illustrated in FIGS. 10, 11, 12, 13, 14, 15, and the like that will be describe later).

Fourth Embodiment

A laser light source 1 according to a fourth embodiment is different from the laser light source 1 according to the first embodiment in that a saturable absorber includes a saturable absorber having a specified crystal orientation. A difference with the laser light source 1 according to the first embodiment is described below.

Figure 10:
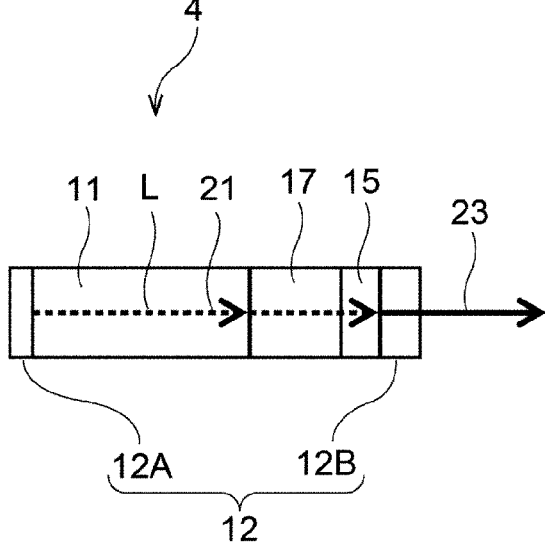
FIG. 10 is a diagram illustrating a configuration of an optical resonator according to a fourth embodiment.

FIG. 10 is a diagram illustrating a configuration of an optical resonator 4 according to the fourth embodiment. As illustrated in FIG. 10, a saturable absorber 17 includes a saturable absorber having a specified crystal orientation. This saturable absorber 17 is, for example, $Cr^{4+}$: YAG crystals. $Cr^{4+}$: YAG crystals have anisotropy, and have a difference in transmittance with respect to rays of emitted light in polarization directions orthogonal to each other in accordance with the crystal orientation. As a result, a laser beam in a stable polarization direction can be output. In particular, in the case of use in the orientation <110>, it is likely that a difference in transmittance with respect to rays of emitted light in polarization directions orthogonal to each other becomes maximum, and a polarization direction of a laser beam that is output from a passively Q-switched laser device can be further stabilized.

As described above, in the laser device 1 according to the present embodiment, the saturable absorber 17 having a specified crystal orientation is included. By doing this, the length of the optical resonator 4 can be further reduced in comparison with a case where a polarization element is inserted between the pair of reflection members 12. Therefore, the laser device 1 according to the present embodiment cannot only generate pulse laser in a stable polarization direction, but can also prevent an increase in a pulse width and a decrease in peak intensity due to an increase in length of the optical resonator 4, and the sizes of the optical resonator 4 and the laser device 1 can be reduced.

Variation of Fourth Embodiment

Figure 11:
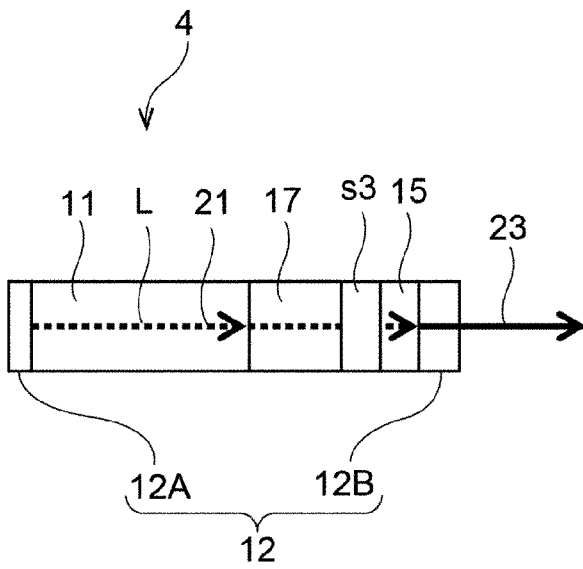
FIG. 11 is a diagram illustrating an example of a configuration of an optical resonator in a variation of the fourth embodiment.

FIG. 11 is a diagram illustrating an example of a configuration of an optical resonator 4 in a variation of the fourth embodiment. As illustrated in FIG. 11, a spacer layer s3 may be included in the optical resonator 4. For example, the spacer layer s3 includes an air layer or a dielectric layer. The spacer layer s3 can be used, for example, to adjust a pulse width and a peak intensity of the laser beam 23. Furthermore, the spacer layer may be included between the laser medium 11 and the saturable absorber 17.

Fifth Embodiment

A laser light source 1 according to a fifth embodiment is different from the laser light source 1 according to the fourth embodiment in that a saturable absorber having a specified crystal orientation is included in two reflection flat faces in a wavelength band limiting element. A difference with the laser light source 1 according to the fourth embodiment is described below.

Figure 12:
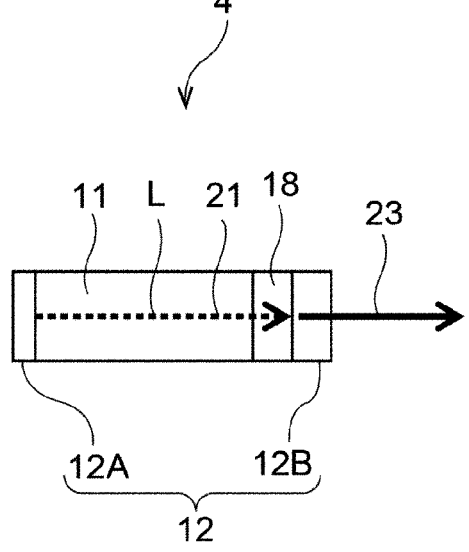
FIG. 12 is a diagram illustrating a configuration of an optical resonator according to a fourth embodiment.

FIG. 12 is a diagram illustrating a configuration of an optical resonator 4 according to the fourth embodiment. As illustrated in FIG. 12, a wavelength band limiting element 18 includes a saturable absorber having a specified crystal orientation in two reflection flat faces in a wavelength band limiting element. More specifically, the wavelength band limiting element 18 includes a saturable absorber having a specified crystal orientation in which transmittance increases according to absorption of emitted light that has been emitted from a laser medium, and two reflection flat face portions that are parallel to each other and are included on both side faces of the saturable absorber.

As described above, in the laser device 1 according to the present embodiment, a saturable absorber having a specified crystal orientation is included in two reflection flat faces in the wavelength band limiting element 18. By doing this, the laser device 1 according to the present embodiment cannot only generate pulse laser in a stable polarization direction, but can also further reduce the length of an optical resonator in comparison with a case where the saturable absorber 14 and the wavelength band limiting element 15 are separately included. Therefore, the laser device 1 according to the present embodiment can further prevent an increase in a pulse width and a decrease in peak intensity due to an increase in length of the optical resonator, and the sizes of the optical resonator 4 and the laser device 1 can be further reduced.

Variation of Fifth Embodiment

Figure 13:
FIG. 13 is a diagram illustrating an example of a configuration of an optical resonator in a variation of the fifth embodiment.
Figure 13:
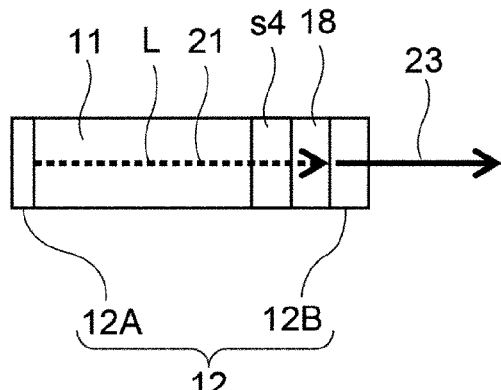

FIG. 13 is a diagram illustrating an example of a configuration of an optical resonator 4 in a variation of the fifth embodiment. As illustrated in FIG. 13, a spacer layer s4 may be included in the optical resonator 4. For example, the spacer layer s4 includes an air layer or a dielectric layer. The spacer layer s4 can be used, for example, to adjust a pulse width and a peak intensity of the laser beam 23.

Sixth Embodiment

A laser light source 1 according to a sixth embodiment is different from the laser light source 1 according to the second embodiment in that a mirror having a polarization function and the wavelength band limiting element 15 are integrally configured. A difference with the laser light source 1 according to the first embodiment is described below.

Figure 14:
FIG. 14 is a diagram illustrating a configuration of an optical resonator according to a sixth embodiment.
Figure 14:
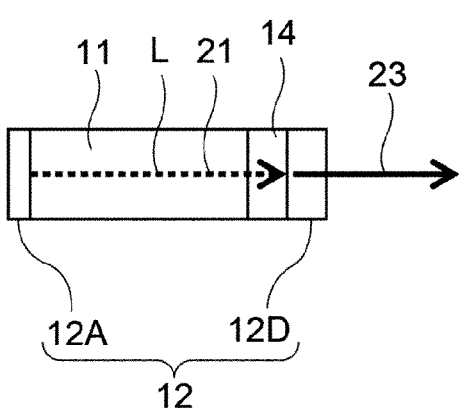

FIG. 14 is a diagram illustrating a configuration of an optical resonator 4 according to the sixth embodiment. As illustrated in FIG. 14, an output mirror 12D has an etalon function and a polarization function. In other words, a flat face on a downstream side of two reflection flat faces that are orthogonal to an optical axis configures a reflection member of the downstream side of the pair of reflection members 12. Furthermore, the output mirror 12D includes a polarization element having a polarization selection function. The polarization element is an element having different reflectance and transmittance of emitted light 21 according to a polarization direction. Reflectance changes with respect to emitted light in each orthogonal polarization direction, and therefore laser oscillation occurs in response to emitted light in a polarization direction that causes a higher reflectance. In other words, a polarization direction of emitted light is controlled by the polarization element, and as a result, a laser beam in a stable polarization direction is generated.

As described above, in the laser device 1 according to the present embodiment, the output mirror 12D is integrally configured as a mirror having a polarization function an element having an etalon function. By doing this, the laser device 1 according to the present embodiment cannot only generate pulse laser in a stable polarization direction, but can also further reduce the length of an optical resonator in comparison with a case where the mirror 12C and the wavelength band limiting element 15 are separately included. Therefore, the laser device 1 according to the present embodiment can further prevent an increase in a pulse width and a decrease in peak intensity due to an increase in length of the optical resonator, and the sizes of the optical resonator 4 and the laser device 1 can be further reduced.

Variation of Sixth Embodiment

Figure 15:
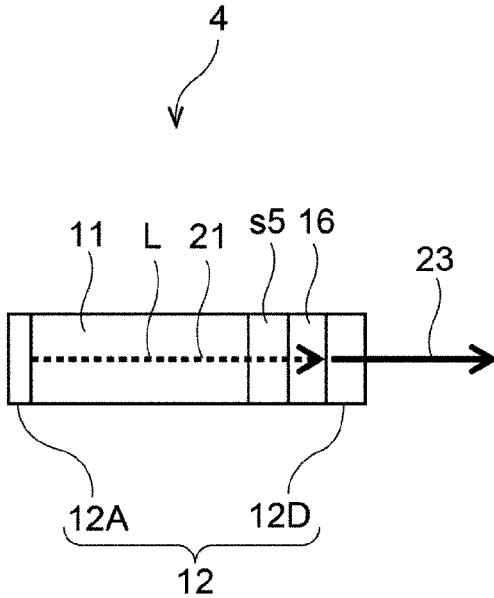
FIG. 15 is a diagram illustrating an example of a configuration of an optical resonator in a variation of the sixth embodiment.

FIG. 15 is a diagram illustrating an example of a configuration of an optical resonator 4 in a variation of the sixth embodiment. As illustrated in FIG. 15, a spacer layer s5 may be included in the optical resonator 4. For example, the spacer layer s4 includes an air layer or a dielectric layer. The spacer layer s5 can be used, for example, to adjust a pulse width and a peak intensity of the laser beam 23.

Note that the laser device 1 according to the present embodiment can be applied to a variety of devices, systems, or the like. For example, the laser device 1 according to the present embodiment may be applied to a device to be used to process metal, a semiconductor, dielectrics, resin, an organism, or the like, a distance measuring device to be used in distance measurement (for example, light detection and ranging or laser imaging detection and ranging (LiDAR)), a device to be used in laser induced breakdown spectroscopy (LIBS), a device to be used in an eyeball refractive index correction operation (for example, LASIK or the like), a device to be used in depth sensing or LiDAR for atmospheric observation of aerosol or the like, or the like. Note that a device that the laser device 1 according to the present embodiment is applied to is not limited to the above.

Note that the present technology can employ the configurations described below.

(1) An optical resonator including:

a laser medium that is disposed between a pair of reflection members, and emits emitted light that has been excited by excitation light that has been predetermined; and a wavelength band limiting element that is disposed on a side of emission of the emitted light between the pair of reflection members, includes two reflection flat faces that are orthogonal to an optical axis of the laser medium, and limits a wavelength band of the emitted light, in which the wavelength band limiting element is disposed in a position where resonance with a reflection member on a laser beam emission side from among the pair of reflection members is prevented from occurring, in a state where a relationship with the optical axis is maintained.

(2) The optical resonator according to (1), in which the wavelength band limiting element and the reflection member on the laser beam emission side are adjacent to each other.

(3) The optical resonator according to (1) or (2), in which a distance between the wavelength band limiting element and the reflection member on the laser beam emission side is within 50 microns.

(4) The optical resonator according to any one of (1) to (3), further including a saturable absorber that is disposed between the laser medium and the wavelength band limiting element, a transmittance of the saturable absorber increasing according to absorption of the emitted light that has been emitted from the laser medium.

(5) The optical resonator according to any one of (1) to (3), in which a saturable absorber is located in the two reflection flat faces, a transmittance of the saturable absorber increasing according to absorption of the emitted light that has been emitted from the laser medium.

(6) The optical resonator according to (5), in which a space layer is provided between the laser medium and the wavelength band limiting element.

(7) The optical resonator according to (4), in which a space layer is provided between the saturable absorber and the wavelength band limiting element.

(8) The optical resonator according to any of (4) to (7), in which the saturable absorber includes a crystal body including first to third crystal axes that are orthogonal to each other, and is disposed in the optical resonator to have respective different transmittances with respect to rays of the emitted light in two polarization directions that are orthogonal to each other, the rays of the emitted light having been emitted from the laser medium.

(9) The optical resonator according to (8), in which a space layer is provided between the saturable absorber and the wavelength band limiting element.

(10) The optical resonator according to (1), in which a saturable absorber is located in the two reflection flat faces, a transmittance of the saturable absorber increasing according to absorption of the emitted light that has been emitted from the laser medium, and the saturable absorber includes a crystal body including first to third crystal axes that are orthogonal to each other, and is disposed in the optical resonator to have respective different transmittances with respect to rays of the emitted light in two polarization directions that are orthogonal to each other, the rays of the emitted light having been emitted from the laser medium.

(11) The optical resonator according to (1), in which a saturable absorber is located in the two reflection flat faces, a transmittance of the saturable absorber increasing according to absorption of the emitted light that has been emitted from the laser medium, the saturable absorber includes a crystal body including first to third crystal axes that are orthogonal to each other, and is disposed in the optical resonator to have respective different transmittances with respect to rays of the emitted light in two polarization directions that are orthogonal to each other, the rays of the emitted light having been emitted from the laser medium, and a space layer is provided between the laser medium and the wavelength band limiting element.

(12) The optical resonator according to any of (1) to (11), in which at least one of the pair of reflection members includes a polarization element, and the polarization element has respective different reflectances with respect to rays of the emitted light in polarization directions that are orthogonal to each other.

(13) The optical resonator according to any of (1) to (12), in which a flat face on the laser beam emission side of the two reflection flat faces that are orthogonal to the optical axis configures a reflection member on the laser beam emission side of the pair of reflection members.

(14) The optical resonator according to any of (1) to (13), further including a heat exhausting substrate that is disposed on a side that is opposite to the laser beam emission side of the laser medium.

(15) The optical resonator according to (12), in which the polarization element includes a photonic crystal having a periodical structure of an inorganic material.

(16) A laser device including:
the optical resonator according to any of (1) to (15); and
an excitation light source unit that causes the excitation light to exit to the laser medium.

(17)
A constituent part of an optical resonator, the constituent part including:
a saturable absorber that has a transmittance that increases according to absorption of emitted light that has been emitted from a laser medium; and two reflection flat face portions that are parallel to each other, and are included on both side faces of the saturable absorber.

(18)
A constituent part of an optical resonator, the constituent part including:
a pair of reflection members that configure the optical resonator; and
a wavelength band limiting element that is disposed on a side of emission of the emitted light between the pair of reflection members, includes two reflection flat faces that are orthogonal to an optical axis of the optical resonator, and limits a wavelength band of the emitted light,
in which a flat face on the side of emission of the emitted light from among the two reflection flat faces that are orthogonal to the optical axis configures a reflection member on the side of emission of the emitted light from among the pair of reflection members.

Aspects of the present disclosure are not limited to the individual embodiments described above, and also include a variety of variations that those skilled in the art could conceive, nor are effects of the present disclosure limited to the content described above. In other words, various additions, changes, and partial deletions can be made without departing from the conceptual ideas and spirit of the present disclosure that are derived from the content specified by the claims and its equivalents.

REFERENCE SIGNS LIST

1 Laser device
2 Excitation light source unit
4 Optical resonator
11 Laser medium
12 A pair of reflection members
12A Mirror
12B, 12C, 12D Output mirror
14 Saturable absorber
15, 16 Wavelength band limiting element
17 Saturable absorber
18 Wavelength band limiting element
s1 to s5 Spacer layer
e1 Heat exhausting substrate

The invention claimed is:
1. An optical resonator, comprising:
a laser medium between a pair of reflection members,
wherein the laser medium is configured to emit emitted light that is excited by excitation light; and
a wavelength band limiting element that is on a side of emission of the emitted light between the pair of reflection members,
wherein the wavelength band limiting element includes two reflection flat faces that are orthogonal to an optical axis of the laser medium,
the wavelength band limiting element is configured to limit a wavelength band of the emitted light,
the wavelength band limiting element is in a position that prevents a generation of a resonance component outside an intended wavelength range of the wavelength band limiting element, the resonance component is prevented between the wavelength band limiting element and a reflection member on a laser beam emission side of the pair of reflection members, and a distance between the wavelength band limiting element and the reflection member on the laser beam emission side is within 50 microns.

2. The optical resonator according to claim 1, wherein the wavelength band limiting element is adjacent to the reflection member on the laser beam emission side.

3. The optical resonator according to claim 1, further comprising a saturable absorber between the laser medium and the wavelength band limiting element, wherein a transmittance of the saturable absorber increases based on absorption of the emitted light emitted from the laser medium.

4. The optical resonator according to claim 3, wherein a space layer is between the saturable absorber and the laser medium, or between the saturable absorber and the wavelength band limiting element.

5. The optical resonator according to claim 3, wherein the saturable absorber includes a crystal body including a first crystal axis, a second crystal axis, and a third crystal axis, the first crystal axis is orthogonal to the second crystal axis and the third crystal axis, the second crystal axis is orthogonal to the first crystal axis and the third crystal axis, each of the first crystal axis, the second crystal axis, and the third crystal axis is disposed in the optical resonator to have respective different transmittances with respect to rays of the emitted light in two polarization directions, the two polarization directions include a first polarization direction and a second polarization direction orthogonal to the first polarization direction, and the rays of the emitted light are emitted from the laser medium.

6. The optical resonator according to claim 5, wherein a space layer is between the saturable absorber and the laser medium, or between the saturable absorber and the wavelength band limiting element.

7. The optical resonator according to claim 1, wherein a saturable absorber is in the two reflection flat faces, and a transmittance of the saturable absorber increases based on absorption of the emitted light emitted from the laser medium.

8. The optical resonator according to claim 7, wherein a space layer is between the laser medium and the wavelength band limiting element.

9. The optical resonator according to claim 1, wherein the two reflection flat faces include a saturable absorber, a transmittance of the saturable absorber increases based on absorption of the emitted light emitted from the laser medium, the saturable absorber includes a crystal body including a first crystal axis, a second crystal axis, and a third crystal axis, the first crystal axis is orthogonal to the second crystal axis and the third crystal axis, the second crystal axis is orthogonal to the first crystal axis and the third crystal axis, each of the first crystal axis, the second crystal axis, and the third crystal axis is in the optical resonator to have respective different transmittances with respect to rays of the emitted light in two polarization directions, the two polarization directions include a first polarization direction and a second polarization direction orthogonal to the first polarization direction, and the rays of the emitted light are emitted from the laser medium.

10. The optical resonator according to claim 1, wherein the two reflection flat faces include a saturable absorber, a transmittance of the saturable absorber increasing according to absorption of the emitted light that has been emitted from the laser medium, the saturable absorber includes a crystal body including a first crystal axis, a second crystal axis, and a third crystal axis, the first crystal axis is orthogonal to the second crystal axis and the third crystal axis, the second crystal axis is orthogonal to the first crystal axis and the third crystal axis, each of the first crystal axis, the second crystal axis, and the third crystal axis is in the optical resonator to have respective different transmittances with respect to rays of the emitted light in two polarization directions, the two polarization directions include a first polarization direction and a second polarization direction orthogonal to the first polarization direction, the rays of the emitted light are emitted from the laser medium, and a space layer is between the laser medium and the wavelength band limiting element.

11. The optical resonator according to claim 1, wherein at least one of the pair of reflection members includes a polarization element, the polarization element has respective different reflectances with respect to rays of the emitted light in polarization directions, and the polarization directions include a first polarization direction and a second polarization direction orthogonal to the first polarization direction.

12. The optical resonator according to claim 11, wherein the polarization element includes a photonic crystal with a periodical structure of an inorganic material.

13. The optical resonator according to claim 1, wherein a flat face on the laser beam emission side of the two reflection flat faces that are orthogonal to the optical axis is configured integrally with the reflection member on the laser beam emission side of the pair of reflection members.

14. The optical resonator according to claim 1, further comprising a heat exhausting substrate on a side that is opposite to the laser beam emission side of the laser medium.

15. The optical resonator according to claim 1, wherein the wavelength band limiting element is in contact with the reflection member on the laser beam emission side.

16. A laser device, comprising:

a laser medium between a pair of reflection members, wherein the laser medium is configured to emit emitted light that is excited by excitation light;

a wavelength band limiting element that is on a side of emission of the emitted light between the pair of reflection members, wherein the wavelength band limiting element includes two reflection flat faces that are orthogonal to an optical axis of the laser medium, the wavelength band limiting element is configured to limit a wavelength band of the emitted light, the wavelength band limiting element is in a position that prevents a generation of a resonance component outside an intended wavelength range of the wavelength band limiting element, the resonance component is prevented between the wavelength band limiting element and a reflection member on a laser beam emission side of the pair of reflection members, and a distance between the wavelength band limiting element and the reflection member on the laser beam emission side is within 50 microns; and an excitation light source unit that is configured to cause the excitation light to exit to the laser medium.

17. A constituent part of an optical resonator, the constituent part comprising:

a laser medium between a pair of reflection members;

a saturable absorber that has a transmittance that increases based on absorption of emitted light emitted from the laser medium; and a wavelength band limiting element that is on a side of emission of the emitted light between the pair of reflection members, wherein the wavelength band limiting element includes two reflection flat faces that are orthogonal to an optical axis of the laser medium, the two reflection flat faces comprises a first flat face and a second flat face parallel to the first flat face, the two reflection flat faces are included on both side faces of the saturable absorber, and a distance between the wavelength band limiting element and a reflection member on a laser beam emission side of the pair of reflection members is within 50 microns.

18. A constituent part of an optical resonator, the constituent part comprising:

a pair of reflection members that configure the optical resonator; and a wavelength band limiting element that is on a side of emission of emitted light between the pair of reflection members, wherein the wavelength band limiting element includes two reflection flat faces that are orthogonal to an optical axis of the optical resonator, and the wavelength band limiting element is configured to limit a wavelength band of the emitted light, the two reflection flat faces include a flat face on the side of emission of the emitted light, the flat face configures a reflection member on the side of emission of the emitted light from among the pair of reflection members, and a distance between the wavelength band limiting element and the reflection member on a laser beam emission side of the pair of reflection members is within 50 microns.

* * * * *